(12) United States Patent
Shakeel et al.

(10) Patent No.: US 10,181,728 B2
(45) Date of Patent: Jan. 15, 2019

(54) SMART GRID SYNCHRONIZATION SCHEME

(71) Applicant: General Electric Company, Schenectady, NY (US)

(72) Inventors: Tabrez Shakeel, Houston, TX (US); Randall John Kleen, Houston, TX (US); Muhammed Rahim, Houston, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 269 days.

(21) Appl. No.: 15/077,665

(22) Filed: Mar. 22, 2016

(65) Prior Publication Data

US 2017/0279280 A1  Sep. 28, 2017

(51) Int. Cl.
*H02J 3/42* (2006.01)
*H02J 3/40* (2006.01)

(52) U.S. Cl.
CPC . *H02J 3/42* (2013.01); *H02J 3/40* (2013.01)

(58) Field of Classification Search
CPC ....... H02J 3/42; H02J 3/40; H02P 9/04; H02P 9/102; G05F 1/12; F01D 15/10
USPC ........................................................ 307/87
See application file for complete search history.

(56) References Cited

U.S. PATENT DOCUMENTS

| 3,794,846 | A | 2/1974 | Schlicher et al. | |
|---|---|---|---|---|
| 6,940,259 | B2* | 9/2005 | Suzuki | H02P 9/00 322/20 |
| 7,915,868 | B1 | 3/2011 | Maters et al. | |
| 7,939,953 | B2* | 5/2011 | Lomax | H02J 3/42 290/4 A |
| 8,866,344 | B2* | 10/2014 | Hedquist | H02J 3/46 307/87 |
| 8,912,672 | B2* | 12/2014 | Pendray | F02D 19/02 290/41 |
| 9,520,757 | B2* | 12/2016 | Hino | F01D 15/10 |

(Continued)

FOREIGN PATENT DOCUMENTS

| CN | 103280842 A | 9/2013 |
|---|---|---|
| WO | 2012/101318 A1 | 8/2012 |
| WO | 2015/130561 A1 | 9/2015 |

OTHER PUBLICATIONS

Extended European Search Report and Opinion issued in connection with corresponding EP Application No. 17162177.4 dated Aug. 3, 2017.

*Primary Examiner* — Dinh T Le
(74) *Attorney, Agent, or Firm* — Fletcher Yoder, P.C.

(57) ABSTRACT

A control system includes memory storing instructions and a processor configured to execute the instructions. The processor is configured to receive a first indication of a power grid voltage, receive a second indication of a power grid phase angle, receive a third indication of a generator voltage of power provided by a generator, and receive a fourth indication of a generator phase angle of power provided by the generator. The processor is configured to determine a voltage gap between the generator voltage and the power grid voltage and a time difference between the generator phase angle and the power grid phase angle. The processor is configured to generate a signal to cause the generator voltage and the generator phase angle to synchronize with the power grid voltage and the power grid phase angle, respectively.

19 Claims, 3 Drawing Sheets

(56) References Cited

U.S. PATENT DOCUMENTS

| | | | |
|---|---|---|---|
| 2001/0005321 A1* | 6/2001 | Ichinose | ............... H02J 3/32 363/95 |
| 2014/0210282 A1 | 7/2014 | Dong et al. | |
| 2015/0295581 A1 | 10/2015 | Shi et al. | |

\* cited by examiner

SMART GRID SYNCHRONIZATION SCHEME

BACKGROUND

The subject matter disclosed herein relates to power grids, and more particularly, to improving synchronization between a power generator and a power grid.

Generators are frequently used to provide electricity for a power grid to power one or more loads. A generator may operate at a certain voltage amplitude, phase, and frequency based on operation of a turbine, such as a gas turbine, steam turbine, or another prime mover. For example, a turbine may provide rotational energy to a shaft that rotates within the generator. The shaft may rotate based on various settings of the turbine, such as an amount of air and fuel entering the turbine. To export power to the power grid, the power generated by the generator is controlled to synchronize with the power on the power grid, and a circuit breaker is closed to electrically couple the generator with the power grid. That is, parameters of the power generated by the generator, such as voltage amplitude, phase, and frequency provided by the generator may be controlled to fall within a range of respective parameters of the grid, such as the voltage amplitude, phase, and frequency, before closing the circuit breaker.

Conventional systems may include synchronization schemes where voltages across the breaker are sensed and the generated voltage is adjusted to meet the grid voltage by sending digital on/off pulses to a voltage regulator to adjust the voltage and speed of the generator. These pulses are used to match the generator voltage and increases or decreases the speed of the turbine to match phase angle with the grid. However, hunting to find the speed of the turbine that corresponds to voltages and phase angles of the power grid may take a considerable amount of time, delaying synchronization. Further, the delay in the response time may be amplified during weak or dynamic grid resulting in manual intervention, which may take even more additional time to synchronize. Because it may take an increased amount of time to synchronize the generator power with the power grid, the grid may become overloaded or further destabilize resulting in an outage. Alternatively and/or additionally, the turbine may waste power during synchronization resulting in less efficient use of fuel.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a control system includes memory storing instructions, and a processor configured to execute the instructions and configured to receive a first indication of a power grid voltage, receive a second indication of a power grid phase angle, receive a third indication of a generator voltage of power provided by a generator, receive a fourth indication of a generator phase angle of power provided by the generator, determine a voltage gap between the generator voltage and the power grid voltage and a time difference between the generator phase angle and the power grid phase angle, and generate a signal to cause the generator voltage and the generator phase angle to synchronize with the power grid voltage and the power grid phase angle, respectively, based at least in part on the voltage gap and the time difference.

In a second embodiment, a non-transitory computer-readable medium includes instructions configured to be executed by a processor of a control system, wherein the configured instructions cause the processor to receive an indication of a voltage phase angle of power on a power grid, receive an indication of a voltage phase angle of power provided by a generator, determine a time difference between the generator voltage phase angle and the power grid voltage phase angle, send a first signal to control the generator voltage phase angle based at least in part on the time difference, and send a signal to a circuit breaker to close the circuit breaker when the time difference is within a tolerance, thereby electrically coupling the power grid to the generator.

In a third embodiment, a method includes receiving, via a processor, a power grid signal indicating a power grid voltage of power on a power grid, receiving, via the processor, a generator signal indicating a generator voltage of power provided by a generator, determining, via the processor, a voltage gap between the generator voltage and the power grid voltage, and sending, via the processor, a signal to adjust a controller that controls the generator voltage to cause the generator to synchronize based on a magnitude of the voltage gap.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
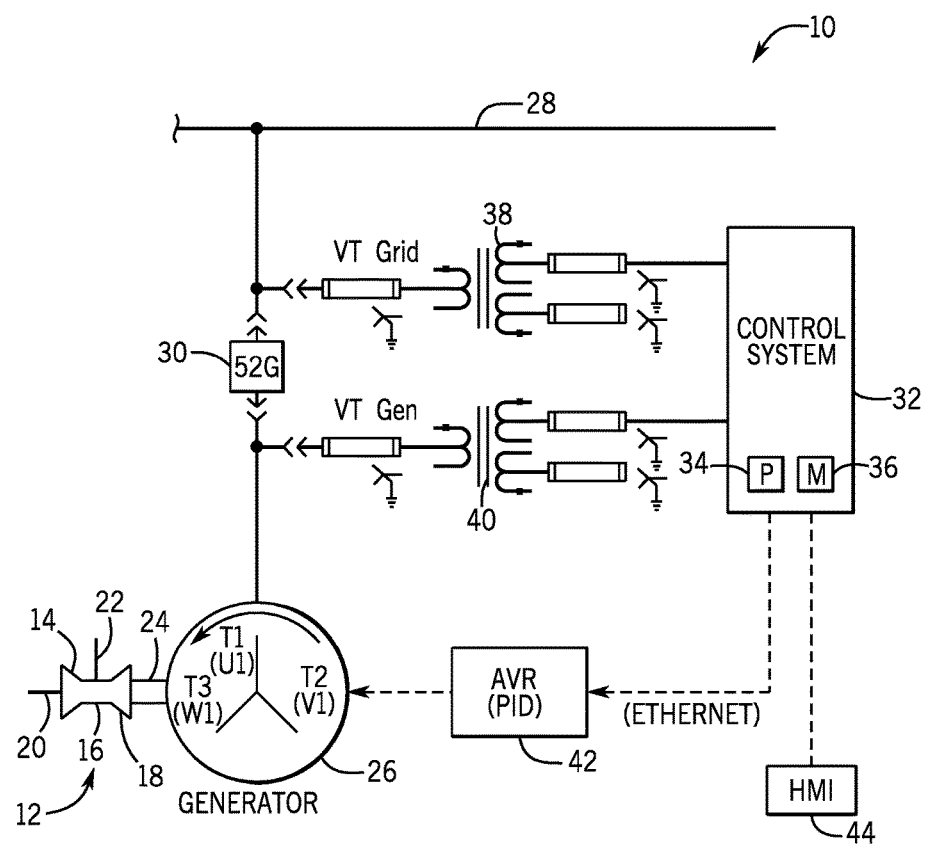
FIG. 1 is a block diagram of a synchronization system having a control system that synchronizes power provided by a generator with power on a power grid.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are related to systems and methods to reduce synchronization delay when closing a breaker that couples power from a generator with power on an unstable power grid. Conventionally, generators may be synchronized to a power grid based on digital pulses to increase or decrease speed of the turbine and/or excitation of the generator. Based on the pulses, the turbine and/or the generator may adjust settings (e.g., the flow of the air and the fuel) to bring a voltage magnitude and phase angle of power provided by the generator within a range of a voltage and phase angle of power on the power grid. For example, in the event that the grid is unstable, micro-oscillations of voltages and phase angles of the power grid may cause an increase in the time it takes to search for voltages and phase angles that synchronize the power provided by the generator with the power of the power grid. Because it may take an increased amount of time to synchronize the generator power with the power grid, the grid may become overloaded or further destabilize resulting in an outage. Alternatively and/or additionally, the turbine may waste power during synchronization resulting in less efficient use of fuel.

A control system may be used to address the delay in synchronizing a generator to within voltage and frequency tolerances that enable the generator to electrically couple to a power grid. The control system may receive a power grid signal from a power grid voltage sensing transformer coupled to the power grid that indicates a voltage and a phase angle (e.g., voltage phase angle) of power on the power grid. The control system may receive a generator signal from a generator voltage sensing transformer coupled to a power line extending from the generator that detects a voltage and phase angle (e.g., voltage phase angle) of power provided by a generator. The control system may synchronize the voltage and phase angle of power provided by the generator by calculating a voltage gap between the power grid voltage and the generator voltage and by calculating a time gap between the phase angle of the power grid and the phase angle of power provided by the generator. The control system may then send a signal to an automatic voltage regulator to control speed of the turbine and/or excitation of the generator based on the calculated voltage gap and time gap.

By way of introduction, FIG. 1 is a diagram of a power synchronization system 10 that includes a gas turbine 12 having a compressor 14, combustor 16, and turbine 18. The gas turbine 12 may receive air 20 to be compressed by the compressor 14. The compressed air is mixed with fuel 22 and the air-fuel mixture is combusted in the combustor 16. The combustion mixture of air and fuel may be used to rotate one or more blades of the turbine 18. A rotor of the turbine 18 may be coupled to a shaft 24 to provide rotational energy to a generator 26. While a gas turbine 12 is described above, any power generation system (e.g., steam or another prime mover) that generates power may be suitable to be used in accordance with embodiments described herein.

The generator 26 converts rotational energy of the shaft 24 into electricity to provide power to a power grid 28. The power grid 28 and/or the generator 26 may each operate at a nominal voltage, such as 10.5 kilovolts (kV) or less, 11 kV, or 11.5 kV or greater. The generator 26 may be electrically coupled to and decoupled from the power grid 28 by closing a circuit breaker 30 and/or electrically decoupled by opening the circuit breaker 30. To ensure stability of connection to the power grid 28, operational characteristics of the gas turbine 12 and/or the generator 26 may be synchronized with power characteristics of the power grid 28, prior to closing the circuit breaker 30. Additional considerations, such as a number of phases, a rotation of the phases, a voltage window, a frequency window, and a phase angle window may be considered to enable synchronization and thereby to enable closure of the circuit breaker 30. Moreover, the number of phases and the rotation of the phases may be verified at the time of equipment selection. A voltage amplitude, phase, and/or frequency of power provided by the generator 26 that corresponds to physical characteristics of the gas turbine 12 (e.g., rotation, torque, etc) may be adjusted to match a voltage amplitude, phase, and/or frequency of the power grid 28 by adjusting the inputs to the gas turbine 12, such as the air 20 and fuel 22. When the voltage amplitude, phase, and/or frequency produced by the generator 26 are within an approved range (e.g., within the voltage window, frequency window, and/or phase window) of the voltage amplitude, phase, and frequency of the power grid 28, then a control system 32 sends a signal that closes the circuit breaker 30.

As previously noted, the voltage and phase of the power grid 28 and the generator 26 may be synchronized within the allowable range prior to closing the circuit breaker 30. The voltage characteristics provided by the generator 26 may be controlled, via an automatic voltage regulator (AVR) 42, by changing a generator excitation voltage (e.g., by controlling the magnetic field of the generator). The AVR 42 setting of 1 per unit (PU) may be derived from the nominal grid voltage. Moreover, the phase angle of the power grid 28 and the phase angle of the power generated by the generator 26 may be synchronized (e.g., approximately matched) by controlling a speed of the gas turbine 12 (e.g., via the air 20 and fuel 22). In some systems, the voltages and phase angles may be controlled by a digital synchronizer module (DSM) that sends digital pulse signals to the prime mover speed governor to hunt for the desired voltage level by incrementing voltages and/or phase angles of the generator until the desired voltages and/or phase angles are found. For example, the DSM may send pulses to change the speed of the gas turbine 12 in the direction of the closest phase coincidence. With respect to the voltage window, the DSM may send pulses to change the generator excitation voltages. However, when the power grid 28 is unstable (e.g., where voltage fluctuation is more likely than a stable gird), achieving the desired voltage window and phase angle window based on pulses in a control loop may cause delays. Further, the delays may involve an operator or grid dispatcher intervening or changing the AVR 42 settings to reach the desired voltages and/or phase angles due to the pulses not accounting for the fluctuations in the unstable grid.

To reduce delays in synchronizing the voltages and/or phase angles, the power synchronization system 10 may include the control system 32 that has a processor 34 or multiple processors and memory 36. The processor 34 may be operatively coupled to the memory 36 to execute instructions for carrying out the presently disclosed techniques. These instructions may be encoded in programs or code stored in a tangible non-transitory computer-readable medium, such as the memory 36 and/or other storage. The processor 34 may be a general-purpose processor, system-on-chip (SoC) device, application-specific integrated circuit, or some other processor configuration.

Memory 36 may include any non-transitory, computer readable medium, such as, without limitation, a hard disk drive, a solid state drive, a diskette, a flash drive, a compact disc (CD), a digital video disc (DVD), random access memory (RAM), and/or any suitable storage device that enables processor 34 to store, retrieve, and/or execute instructions and/or data. Memory 36 may further include one or more local and/or remote storage devices.

The control system 32 may be programmed or configured (e.g., performed via the processor 34 and the memory 36) to receive one or more signals via a power grid voltage sensing transformer (VT) 38 that detects power characteristics of the power grid 28 and a generator voltage sensing transformer (VT) 40 that detects power characteristics of the power provided by the generator 26. For example, the processor 34 may receive signals, via the power grid VT 38 and generator VT 40, indicating the voltage magnitude, phase, and/or frequency of power on the power grid 28 and the generator 26, respectively. The processor 34 may receive sample values of the voltages of the power grid VT 38 and/or generator VT 40 at a sample rate that avoids signal aliasing (e.g., greater than 8 times per cycle). Further, to ensure steady samples, the processor 34 may receive a sample for a preset time or number of cycles (i.e., periods), such as one, two, five, ten, or more cycles. For instance, five cycles at 50 hertz may take approximately 100 milliseconds (ms). The processor 34 may convert the received sample values into coordinates associated with a voltage value at a time value (V, T).

The control system 32 may be communicatively coupled to the AVR 42 and a human machine interface (HMI) 44. The HMI may include a display and/or other inputs and outputs to enable an operator to select options/values, such as the tolerance limits of the voltage window, phase angle limits of the phase angle window, or the like. Further, the HMI may allow data of signals received by the control system 32 to be viewed. The control system 32 may be communicatively coupled, via Ethernet, wireless connection, or any other suitable method.

Figure 2:
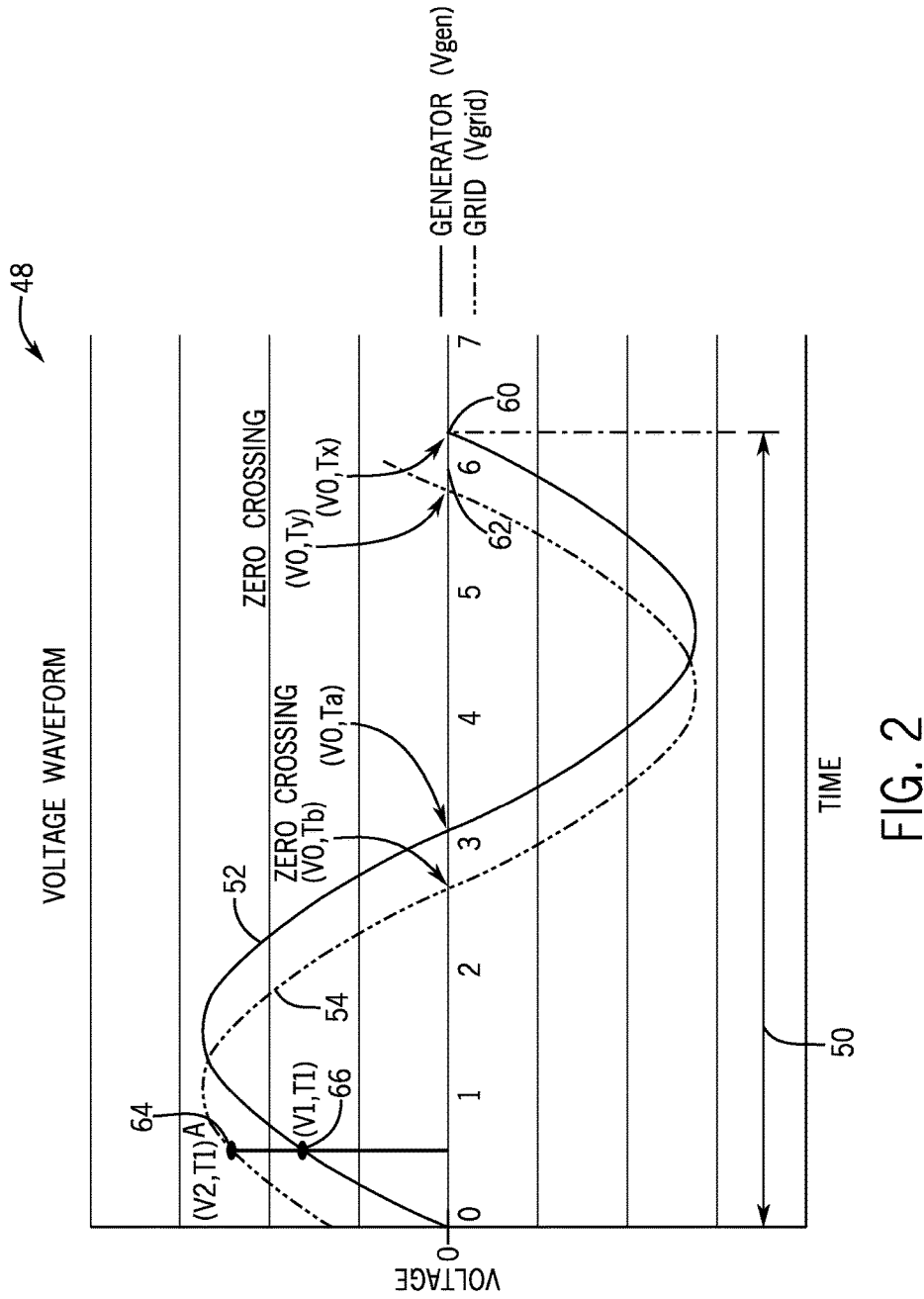
FIG. 2 shows a graph of data received by the control system from the power grid and the generator of FIG. 1.

FIG. 2 shows a graph 48 of an example of generator waveform 52 representing a variation of voltage over time and a grid waveform 54 representing a variation of voltage over time during a cycle over time 50. The processor 34 may receive the voltages on the power grid 28 via the power grid VT 28 and the voltages provided by the generator 26 via the generator VT 40. Although the graph 48 may be displayed on a display associated with the control system 32, the AVR 42, or the HMI 44, the graph 48 is meant to be illustrative, and the data may simply be processed by the processor 34 without being displayed. As shown in the graph 48, each coordinate falling on waveforms 52 and 54 may be determined by the processor 34 from each sample and may include a voltage and time value of the generator waveform 52 and/or the power grid waveform 54. Corresponding values of the waveforms may be used, for instance, to calculate a difference between the power grid voltage and the generator voltage for corresponding points (e.g., zero crossing, time, voltage, etc).

Figure 3:
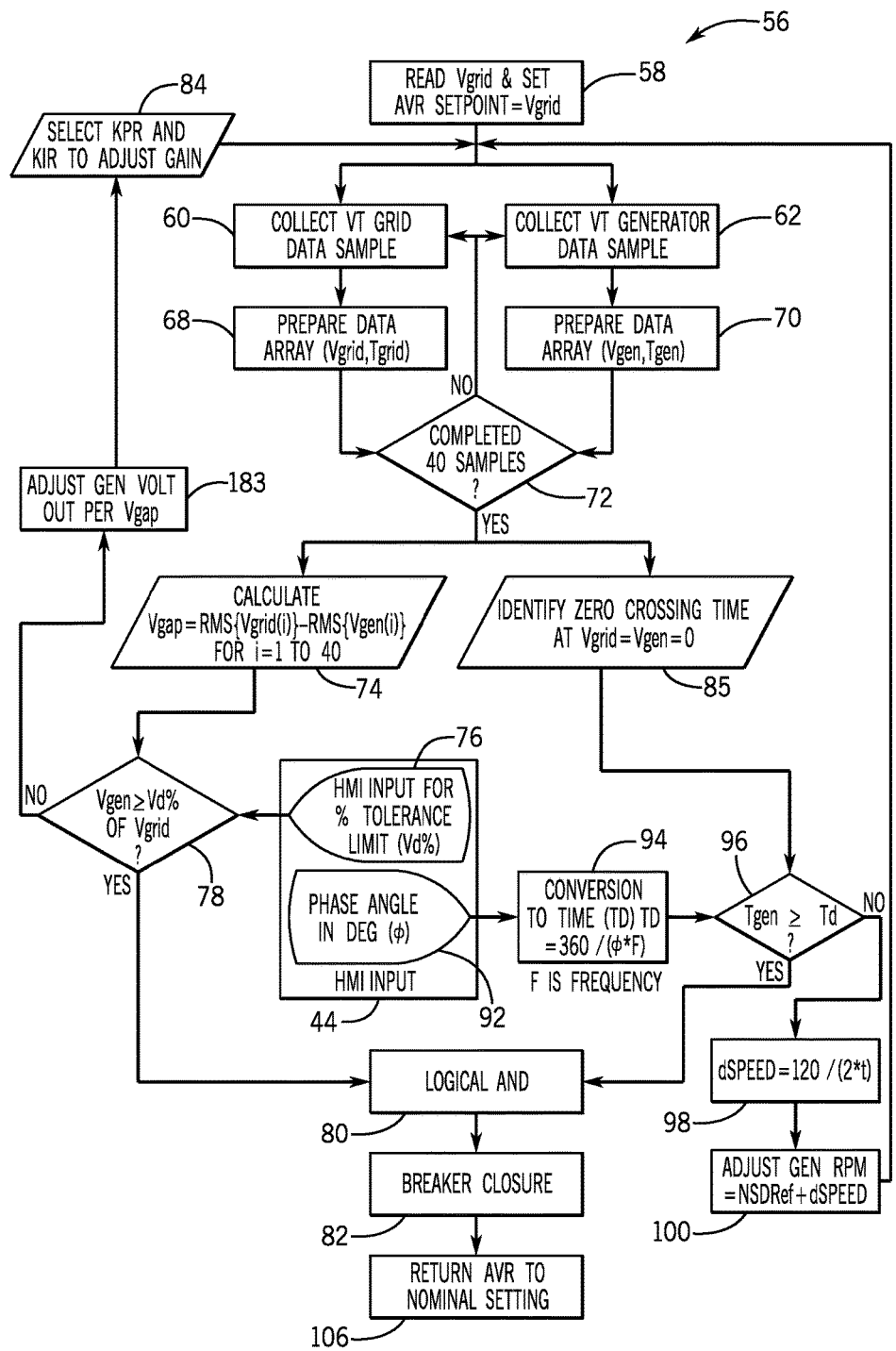
FIG. 3 is a flow diagram of a process performed by a processor of the control system of FIG. 1 to synchronize power provided by the generator with power on the power grid.

FIG. 3 shows a process 56 for synchronizing the gas turbine with the power grid so that the beaker may be closed. FIG. 3 is discussed below in conjunction with the graph 48 of FIG. 2. Process 56 described below may be stored in the memory 36 of the control system 32 as instructions executed by the processor 34 (e.g., running code). At block 58, the processor 34 may begin by adjusting an AVR 42 setpoint to be $V_{grid}$ so that the generator 26 is configured to meet a desired voltage of the power grid 28.

At blocks 60 and 62, the processor 34 may collect a power grid VT 38 data sample and a generator VT 40 data sample, respectively. For example, as shown in FIG. 2, the processor 34 may receive a signal indicating a power grid voltage corresponding to a coordinate 64 ($V_2$, $T_1$) and a signal indicating a generator voltage corresponding to a coordinate 66 ($V_1$, $T_1$). At blocks 68 and 70, the processor 34 may then respectively store the $V_{grid}$ samples and the $V_{gen}$ samples in data arrays.

Further, at block 72, the processor 34 may continue to collect samples until a preset threshold number of samples has been reached. For example, if the control system 32 is configured to measure a number (e.g., eight) samples per cycle for a number cycles, then the processor 34 may continue collecting samples from each of the power grid VT 38 and the generator VT 40 until a threshold number (e.g., forty) samples are measured. Although the process 56 shows blocks 60 and 68 in parallel with blocks 62 and 70, in some embodiments, these steps may be performed sequentially rather than simultaneously. For example, blocks 60 and 68 may precede blocks 62 and 70 or vice versa.

When the preset threshold has been reached at block 72, the processor 34 may then calculate a voltage gap between the $V_{grid}$ samples and the $V_{gen}$ samples. From the graph 48, the following equation may be derived:

$$\text{Voltage Gap}(V_{gap}) = V_2 - V_1 = V_{grid} - V_{gen} \quad (1)$$

where $V_2$ is the power grid voltage at time $T_1$ and $V_1$ is the generator voltage at time $T_1$. Further, for the preset number of cycles, the samples may be used for a root means square (RMS) calculation where average electrical power of $V_{gap}$ is calculated at block 74:

$$V_{gap} = \text{RMS}(V_{grid,i}) - \text{RMS}(V_{gen,i}) \quad (2)$$

where i is the sample number.

At block 76, the processor 34 may receive a tolerance or percentage threshold voltage (Vd %) value that is an accepted tolerance between $V_{gen}$ and $V_{grid}$. While the process 56 includes receiving a selection of the tolerance value via the HMI 44, in other embodiments, the processor 34 may simply have a default preset value (e.g., 1%, 3%, or 5%). Further, in some embodiments, the processor 34 may receive, via the HMI 44, an adjusted value when an operator changes the default value to customize the tolerance based on system configurations.

At block 78, the processor 34 may determine whether the $V_{gen}$ value is greater than the tolerance level of the $V_{grid}$ value. If $V_{gen}$ is greater than the tolerance value (Vd %) with respect to the $V_{grid}$, the processor 34 also determines timing tolerance thresholds, as discussed below. If both the timing thresholds and the voltage thresholds are met (block 80), then the processor 34 may send signals to close the breaker 30 at block 82.

At block 83, if the voltage threshold has not been met, the processor 34 may send a signal to the AVR 42 to adjust a generator voltage based on $V_{gap}$. For example, the processor 34 may send the adjusted generator voltage, via Ethernet, for the AVR 42 to account for the voltage difference between the power grid 28 and the generator 26. That is, instead of hunting or searching to match the generator voltage with the voltage of the power grid 28, the processor 34 may determine the difference between the voltage of the generator 26 and the voltage of the power grid 28, thereby reducing an amount of time to adjust the voltages provided by the generator 26 for synchronization.

At block 84, the processor 34 may send signals to the AVR 42 to update the proportional-integral-derivative (PID) gain of the AVR 42 during the synchronization process. That is, the control system 32 may enable a faster voltage response in the AVR 42 by adjusting the PID gain factors during the synchronization process to achieve a faster synchronization than using preset values in the PID controller. For example, the proportional (KPR) and integral (KIR) gains of the AVR 42 PID control will be dynamically adjusted to increase or decrease a voltage ramp rate. By changing the PID control factors of the AVR 42, the reaction time of decreasing the error between the voltage provided by the generator 26 and the voltage of the power grid 28 may be reduced as compared to using constant values as gain factors. As such, the control signals sent by the processor 34 to the AVR 42 that control the generator 26 may enable faster synchronization with the power grid 28 as compared an AVR 42 that uses preset gain factors.

The processor 34 may update KPR and KIR factors based on the generator voltage and send a signal to the AVR 42 indicating the updated KPR and KIR factors. The processor 34 may utilize a lookup table to control gain values that are used to adjust the AVR response rate. Table 1 below is an example of values that may be used to adjust the AVR response rate.

TABLE 1

| Gain Factors | | | | | | | |
|---|---|---|---|---|---|---|---|
| Small Difference | | | Nominal | | | Large difference | |
| KPR | 15 | 22 | 28 | 20 | 36 | 43 | 50 |
| KIR | 15 | 19 | 23 | 20 | 25 | 31 | 35 |

The AVR 42 may then receive the KPR and KIR values to adjust the AVR response rate. Based on the received values, the AVR 42 may send signals to generator excitation circuit to rapidly increase or decrease excitation of the generator, thereby controlling the voltage provided by the generator 26. For example, if the difference between the voltage on the power grid and the voltage provided by the generator is a small difference, then the processor 34 may send a lower value of KPR and KIR to be used in the PID controller to reduce likelihood of overshooting a target voltage while reducing the difference between the voltages of the grid and generator. Conversely, if the difference between the power grid and generator voltages is larger than the small difference, then the processor 34 may send a larger KPR and KIR value to be used by the AVR to more aggressively reduce the difference (as compared to the small difference). That is, the processor 34 may send a signal that adjusts the PID controller of the AVR 42 to cause the generator 26 to synchronize based on a magnitude of the voltage gap where the magnitude of the voltage gap is proportional to the gain values selected from the lookup table. By sending signals to adjust the PID settings of the AVR 42, the processor 34 may enable the power generated by the generator 26 to synchronize at a faster rate than pulse techniques that search for matching voltages.

At block 85, the processor 34 may identify a zero crossing time based on the samples of coordinates that correspond to times that the voltage of the power grid 28 and the voltage provided by the generator 26 are zero (i.e., times where $V_{grid}$ and $V_{gen}$=0). For example, as shown in FIG. 2, the processor 34 may identify coordinate 86 ($V_0$, $T_b$) and coordinate 88 ($V_0$, $T_a$) as the zero crossing time of the power grid waveform 54 and the generator waveform 52, respectively. Further, at block 90, the processor 34 may calculate a phase shift, where the phase shift ($T_b$-$T_a$) is a time difference between when the voltage of the power grid crosses the zero voltage line ($T_b$) and when the voltage provided by the generator crosses the zero voltage line ($T_a$).

At block 92, the processor 34 may receive a selection of a phase angle (e.g., Φ) that indicates a tolerance between the phases of the power grid 28 and the generator 26. In some embodiments, the value may preset as received from a user via the HMI 44. At block 94, the processor 34 may convert the phase angle into a time threshold ($T_d$) using the following equation:

$$T_d = \frac{360}{\Phi * F} \quad (3)$$

where Φ is the received phase angle in degrees and F is the frequency of the shaft 24.

Then, the processor 34 may compare the time of the generator $T_{gen}$ to the time threshold $T_d$. If $T_{gen}$ is greater than or equal to the threshold $T_d$ (block 96) and $V_{gen}$ is greater than Vd % (block 80), then the processor 34 may send a signal to perform the breaker closure at block 82. If $T_{gen}$ is not greater or equal to $T_d$ and Vd %, then the processor may adjust the generator speed, as discussed below.

At block 98, the processor 34 may calculate a desired change in RPM speed (dSpeed). As described below, to compensate for the phase shift, the turbine speed may be increased or reduced based on a calculated RPM.

$$RPM = \frac{120 * F}{\# \text{ of Poles}} \quad (4)$$

where the RPM is the revolutions per minute of the shaft 24 within the generator 26. From equation (4), if the generator 26 is a two pole generator 26, then the following equation may be derived:

$$RPM = \frac{120}{T * 2} \quad (5)$$

where T is the time period (1/F). As such, the desired change in RPM speed may be determined by the following equation:

$$RPM = \frac{120}{(T_b - T_a) * 2} \quad (6)$$

At block 100, the control system 32 may then send a signal to the gas turbine 12 to adjust the generator RPM speed based on the current generator RPM speed (NSDRef) and the desired change in RPM speed. For example, the control system 32 may send the adjusted generator RPM speed setting to the speed governor to account for a difference between the phase angle of the generator 26 and the phase angle of the voltage of the power grid 28. That is, instead of hunting or searching to match the generator phase with the phase of the power grid 28, the processor 34 may determine the difference between the phase angle of the generator 26 and the phase angle of the power grid 28. Then, the processor 34 may send signals to the speed governor indicating the adjusted generator RPM settings to reduce an amount of time to adjust the turbine speed for synchronization, thereby reducing the time to close the breaker 30.

Technical effects of the invention include sending signals to an automatic voltage regulator (AVR) and speed governor to control a generator and gas turbine to synchronize power provided by the generator with power on a power grid. In some embodiments, a control system receives voltages and phase angles from a power grid and a generator. In certain embodiments, the control system determines a voltage gap between the generator voltage and the power grid voltage and a time difference between the generator phase angle and the power grid phase angle. In some embodiments, the control system may send a signal to regulate the generator voltage and the generator phase angle of the power provided by the generator based on the voltage gap and the time difference. By sending signals to the AVR, the speed of the gas turbine may be controlled to synchronize with the power grid.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A control system, comprising:
   memory storing instructions; and
   a processor coupled to the memory and configured to execute the instructions and configured to:
      receive a first indication of a power grid voltage;
      receive a second indication of a power grid phase angle;
      receive a third indication of a generator voltage of power provided by a generator;
      receive a fourth indication of a generator phase angle of the power provided by the generator;
      calculate a voltage gap between the generator voltage and the power grid voltage and determine a time difference between the corresponding phase angles of the generator phase angle and the power grid phase angle; and
      generate a signal to cause the generator to set a generator speed to synchronize the generator voltage and the generator phase angle with the power grid voltage and the power grid phase angle, respectively, based at least in part on the calculated voltage gap and the time difference.

2. The control system of claim 1, wherein the processor is configured to send the signal to a voltage regulator that controls the generator voltage such that the voltage gap is reduced.

3. The control system of claim 1, wherein the processor is configured to send the signal to adjust at least one of a proportional, integral, or derivative (PID) gain factor of a controller during synchronization between the power grid and the generator.

4. The control system of claim 3, wherein the processor is configured to comprising adjust at least one of the PID gain factors based on a magnitude of the voltage gap.

5. The control system of claim 1, wherein the processor is configured to obtain thresholds of an accepted tolerance between the power grid voltage and the generator voltage, via human machine interface (HMI) or retrieved from the memory, to control when the generator voltage and the generator phase angle are deemed to be synchronized with the power grid voltage and power grid phase angle.

6. The control system of claim 1, wherein the processor is configured to receive the first and second indications from a voltage sensing transformer.

7. The control system of claim 1, wherein the processor is configured to:
   obtain measured samples of the power grid voltage and the generator voltage at corresponding points;
   subtract the sampled power grid voltage from the sampled generator voltage; and
   identify the voltage gap as the difference between the sampled power grid voltage and the sampled generator voltage.

8. The control system of claim 1, comprising:
   a first voltage sensing transformer that receives the first and second indications from the power grid; and
   a second voltage sensing transformer that receives the third and fourth indications of power provided by the generator.

9. The control system of claim 1, wherein the processor is configured to determine a root means square of multiple sampled voltage gaps as the voltage gap.

10. A non-transitory computer-readable medium comprising instructions configured to be executed by a processor of a control system, wherein the instructions comprise instructions configured to cause the processor to:
    receive a first indication of a power grid phase angle of power on a power grid;
    receive a second indication of a generator phase angle of power provided by a generator;
    receive a third indication of a power grid voltage of the power grid;
    receive a fourth indication of a generator voltage of the power provided by the generator;
    determine a time difference between the generator phase angle and the power grid phase angle;
    calculate a voltage gap between the generator voltage and the power grid voltage;
    send a first signal to set a generator speed based at least in part on the time difference and the voltage gap; and
    send a second signal to a circuit breaker to close the circuit breaker when the time difference is within a tolerance, thereby electrically coupling the power grid to the generator.

11. The non-transitory computer readable medium of claim 10, comprising instructions configured to cause the processor to send the first signal to a voltage regulator that controls the generator speed to control the generator phase angle, wherein the generator speed is controlled based at least in part on a current generator speed and the time difference.

12. The non-transitory computer readable medium of claim 10, comprising instructions configured to cause the processor to adjust the generator speed by adjusting a current generator speed to an updated speed based on a constant value divided by the time difference.

13. The non-transitory computer readable medium of claim 10, comprising instructions configured to cause the processor to determine the time difference by comparing when the generator voltage crosses a zero voltage line with when the power grid voltage cross the zero voltage line.

14. The non-transitory computer readable medium of claim 10, comprising instructions configured to cause the processor to obtain a selection threshold of an accepted tolerance between the power grid phase angle and the generator phase angle, via a human machine interface (HMI) or retrieved from a memory operatively coupled to the processor, to when the generator phase angle is deemed to be synchronized with the power grid phase angle.

15. A method, comprising:
    receiving, via a processor, a power grid signal indicating a power grid voltage of power on a power grid;
    receiving, via the processor, a generator signal indicating a generator voltage of power provided by a generator;
    calculating, via the processor, a voltage gap between the generator voltage and the power grid voltage; and
    sending, via the processor, a control signal to adjust a controller to set a generator speed of the generator to cause the generator to synchronize the power grid voltage and the generator voltage based at least in part on a magnitude of the voltage gap.

16. The method of claim 15, comprising sending the control signal to a voltage regulator that controls the generator voltage, via generator excitation, such that the voltage gap is reduced.

17. The method of claim 15, comprising adjusting at least one of a proportional, integral, or derivative (PID) gain factor of the controller during synchronization between the power grid and the generator based on the control signal.

18. The method of claim 17, comprising adjusting the PID gain factor in proportion to the magnitude of the voltage gap.

19. The method of claim 15, comprising:
    obtaining measurement samples of the power grid voltage and the generator voltage at corresponding points;
    subtracting the sampled power grid voltage from the sampled generator voltage; and
    identifying the voltage gap as the difference between the sampled power grid voltage and the sampled generator voltage.

* * * * *